C. DUPUIS.
PROJECTION APPARATUS.
APPLICATION FILED JUNE 7, 1909.
957,502.
Patented May 10, 1910.
FIG_1_
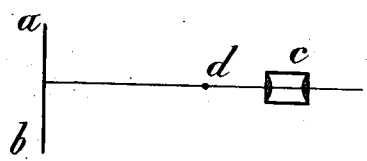
FIG_2_
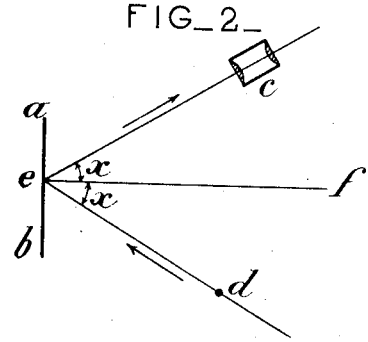
FIG_3_
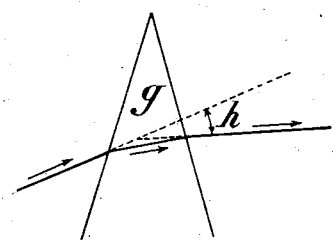
FIG_4_
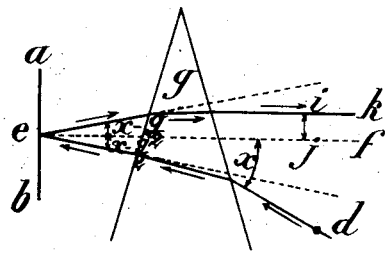
FIG_5_
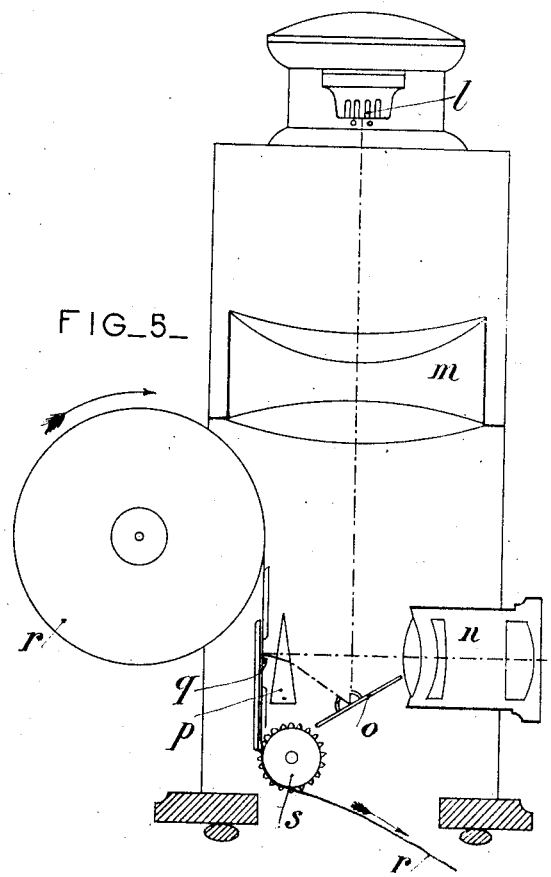
Attest:
H. M. Barrett
Edward N. Saxton
Inventor
Charles Dupuis
by Wm Wallace White
Attys

UNITED STATES PATENT OFFICE.

CHARLES DUPUIS, OF VINCENNES, FRANCE.

PROJECTION APPARATUS.

957,502.  Specification of Letters Patent.  Patented May 10, 1910.

Application filed June 7, 1909. Serial No. 500,710.

*To all whom it may concern:*

Be it known that I, CHARLES DUPUIS, citizen of France, residing at 18 Rue de Paris, Vincennes, Seine, in the Republic of France, have invented new and useful Improvements in Projection Apparatus, of which the following is a specification.

My invention relates to an improvement in projection apparatus, adapted for use in lighting images produced on any metallic, polished and reflecting surface. One of the objects resides in permitting the projection of the images in the best conditions as regards clearness and luminosity.

It is known that a polished silver surface reflects specularly about 90% of the incident light and also that the transparent flexible supports, formed for instance of a cellulose compound absorb by transmission about 10% of the light. It results therefrom that if the backs of the image are mat, projections may be obtained by means of properly metallized supports, which are as vigorous and luminous as by means of the usual transparent supports.

Although theoretically the light reflected may be the same in both cases, the practice has proved that many obstacles arise in lighting said shining or reflecting surfaces which are subjected to the rules of specular reflexion and that the luminosity of the projections is mostly obtained to the detriment of the clearness thereof. This results from the fact that according to the usual method for projecting transparent images, the optical axis of the objective should be at right angles with the image and the projection screen and should pass in the center thereof and also that the luminous point of the source of light should be on the same axis. This is however impossible to be obtained with opaque images, as may be seen from the following considerations:

The invention is shown in the accompanying drawings, in which:—

Figures 1, 2, 3 and 4 are diagrammatic views illustrating the invention, while Fig. 5 is a vertical section showing the application of the invention to a moving picture machine.

If an image $a$—$b$ (Fig. 1) is printed on a brilliant metallized paper by photographic or photo-mechanical means, in order to see the white parts of the image in full brightness, it is necessary to light said image perpendicularly and to observe it in the same direction, either with the naked eye or with such an apparatus as a projection objective $c$ located at the place of the eye. This would however result in inserting the light source $d$ between the image and the eye or objective. It is therefore materially impossible of practically embodying said device as the source $d$ would conceal the central part of the image.

By locating the source $d$ laterally, as shown in Fig. 2, so as to light the image under the angle of incidence $x$, said image may also be seen in full brightness provided that it be observed in the direction of regular reflexion, symmetrically to the direction of lighting with regard to the normal $e\ f$. This method would however have the following consequences: 1° a deformation of the image which would be seen obliquely; 2° an impossibility of focusing the whole of the image, for projecting purposes, in view of said obliquity.

By the method according to the invention, the direction in which the image is observed may be made to coincide with the normal direction $e\ f$ so as to avoid the above stated objections. This method consists in inserting in front of said image a prism $g$ of a slight angle suitably selected, as shown in Fig. 3. It is known that a prism with a small angle $g$, receiving a light beam under a small angle of incidence, deflects the same on an angle $h$ given by the expression:

$$h = (n-1)g$$

$n$ being the refraction index of the substance forming the prism and being equal to $\frac{3}{2}$ for ordinary glass, therefore:

$$h = (\tfrac{3}{2} - 1)g = \tfrac{g}{2}.$$

The deflection is therefore equal to the half of the prism angle.

If such a prism is placed in front of the image $a\ b$, as shown in Fig. 4, the source of light $d$ being located laterally so that its rays make an angle of incidence $x$, said rays, by traversing the prism, are deflected on an angle $\frac{g}{2}$ toward the base thereof. They reach the image with an incidence reduced to $x-\frac{g}{2}$ and are reflected in the symmetrical direction making an equal angle $x-\frac{g}{2}$ with the normal. By re-traversing the prism on their backward stroke, said rays are deflected again of an angle $\frac{g}{2}$ toward the base of the prism, and leave said prism in a direction making with the normal an angle equal to $$(x-\frac{g}{2})-\frac{g}{2}=x-g$$

said direction being precisely that of the normal if $x-g=o$ i. e. if $x=g$, or in other words, if the light source $d$ has been placed laterally at an angular distance to the normal equal to the angle $g$ of the prism.

The angle of the prism should generally be of about 15 degrees.

The effective direction for observing or projecting the image is therefore made to be the normal to said image, which is seen consequently without deformation, the difficulties for focusing being also removed.

To prevent the deformation of the image refracted through the prism, it is necessary to arrange the prism so that its bisecting plane be parallel to the plane of the image. Besides the converging pencil of the source of light must be directed on the prism in such a manner that the axis of said pencil be always in a plane perpendicular to the edge of the prism.

The observation of the image through the prism does not produce any deformation thereof as the image, by the deflection caused by the prism, appears to be transported bodily in its own plane toward the apex of the prism. The displacement is shown at the Fig. 4 by the distance $i\,j$. It will therefore be sufficient to carry the eye or objective on the same distance toward the top of the drawing, i. e. to center said eye or objective on $i\,k$ instead of centering it on $e\,f$, for obtaining the same result as if the source of light had been inserted between the image and the organ observing it.

As a lens is nothing more than a series of prisms with a small angle, a part of a lens may be substituted for the prism so as to magnify the images while deflecting the same.

In all methods of projection, the light beam lighting the image should form a cone the apex of which lies at the diaphragm of the objective, and condensing lenses or a concave mirror are used for causing the rays emitted by the source of light to converge. When practically embodying the arrangement shown diagrammatically in Fig. 4, it will be remarked that in view of the great diameter of the condenser, it will be necessary to augment the obliquity of the lighting so that the rear part of the objective-tube does not cut off a number of the rays leaving the condenser; said obliquity must however be avoided in order to keep the angle $g$ of the prism within moderate limits.

The following device enables the obliquity of the lighting beam to be reduced to a minimum, whatever the diameter of the condenser may be.

As the lenses of objectives are always cut according to a circle, the center of which is on the optical axis, the greatest image capable of being suitably projected should be limited also by a circle. In practice circular images are used very seldom and square or preferably rectangular images are mostly utilized. In the last case, if the rear combination of an objective is shown by a circle of the same diameter, and if a square or a rectangle proportional to the image is inscribed in said circle, the parts of the circle exterior to the square or rectangle represent in full size the four segments of the lenses which do not participate to the projection of the image. Said segments may therefore be concealed without interfering with the qualities of the projected image.

According to the invention, one segment of the rear lenses of the objective is concealed by a plane mirror suitably inclined for reflecting toward the image the light beam coming from the condenser. The lighting obtained is therefore so much the less oblique as the rectangle limiting the image is more elongated.

Fig. 5 of the annexed drawing is a vertical section showing by way of example, one embodiment of the method according to the invention, particularly adapted to kinematographic mechanisms for projecting animated views. In this figure: $l$ represents the source of light, a Nernst lamp for instance, $m$ is the condensing lenses; $n$, the objective; $o$ the plane mirror; $p$ the prism; $q$ represents the image and $r$ the metallized band carrying the images. $s$ is the feed drum which communicates to the band a step by step motion. The way followed by the light beam is shown by a dotted line.

Having now described my invention, what I claim as new and desire to secure by Letters Patent is:

1. In a device of the class described, the combination with an opaque reflecting surface having an image thereon to be reflected, of a source of light, a prism arranged with its bisecting plane parallel to the plane of the image and interposed between the source of light and the image, said prism being so positioned that the axis of the rays of light directed upon the prism will lie in a plane perpendicular to the edge thereof.

2. In a device of the class described, the combination with an opaque reflecting surface having an image thereon to be reflected, of a source of light, a prism arranged with its bisecting angle in a plane parallel to the plane of the image and interposed between said image and said source of light, and means interposed between said source of light and said prism to direct a pencil of light upon said prism, said parts being so positioned that the axis of the pencil of light will lie in a plane perpendicular to the edge of the prism.

3. In a device of the class described, the combination with an opaque reflecting surface having an image thereon to be reflected, of a source of light, a prism arranged with its bisecting angle in a plane parallel to the plane of the image and interposed between said image and said source of light, and means interposed between said source of light and said prism to direct a pencil of light upon said prism, said parts being so positioned and proportioned that the angle formed between the axis of the pencil of light and a line normal to the plane of the image will be substantially equal to the angle of the prism.

4. In a device of the class described, the combination with an opaque reflecting surface having an image thereon to be reflected, of a source of light, a prism arranged with its bisecting plane parallel to the plane of the image, a reflector adapted to direct the light from said source upon said prism, and means interposed between said source of light and said reflector for directing a pencil of light thereon, said reflector being so positioned relatively to said means and said prism that the axis of the pencil of light directed upon the said prism will lie in a plane perpendicular to the edge thereof.

In testimony whereof I have signed my name to this specification in the presence of two subscribing witnesses.

CHARLES DUPUIS.

Witnesses:
 LOUIS MOSÈS,
 H. C. COXE.